(12) United States Patent
Fang et al.

(10) Patent No.: US 12,259,322 B2
(45) Date of Patent: Mar. 25, 2025

(54) DETECTION METHOD AND DETECTION SYSTEM USING SUSPENSION LIQUID BIOCHIP

(71) Applicant: HANGZHOU SHINEDO BIOTECH CO., LTD., Hangzhou (CN)

(72) Inventors: Jianqiu Fang, Hangzhou (CN); Wanwan Li, Shanghai (CN); Chunmei Zhong, Hangzhou (CN)

(*) Notice: Subject to any disclaimer, the term of this patent is extended or adjusted under 35 U.S.C. 154(b) by 369 days.

(21) Appl. No.: 17/605,842

(22) PCT Filed: Apr. 22, 2020

(86) PCT No.: PCT/CN2020/086225
§ 371 (c)(1),
(2) Date: Jun. 3, 2022

(87) PCT Pub. No.: WO2020/216261
PCT Pub. Date: Oct. 29, 2020

(65) Prior Publication Data
US 2022/0299441 A1    Sep. 22, 2022

(30) Foreign Application Priority Data
Apr. 23, 2019  (CN) .......................... 201910329309.8
Apr. 23, 2019  (CN) .......................... 201910329326.1

(51) Int. Cl.
*G01N 21/64*    (2006.01)
(52) U.S. Cl.
CPC ..... *G01N 21/6428* (2013.01); *G01N 21/6452* (2013.01); *G01N 2021/6421* (2013.01)
(58) Field of Classification Search
CPC ........... G01N 21/6428; G01N 21/6452; G01N 2021/6421; G01N 2201/0245;
(Continued)

(56) References Cited

U.S. PATENT DOCUMENTS 6,680,211 B2    1/2004  Barbera-Guillem et al.
9,163,869 B2   10/2015  Warhusrt et al.
(Continued)

FOREIGN PATENT DOCUMENTS

CN          1690692 A    11/2005
CN        101074964 A    11/2007
(Continued)

OTHER PUBLICATIONS

R. Jerrold Fulton, et al., "Advanced multiplexed analysis with the FlowMetrix system" (Clinical Chemistry, Oxford University Press, US, vol. 43, No. 9, 1997, pp. 1749-1756, XP002187655, issn: 0009-9147).

(Continued)

*Primary Examiner* — Jill A Warden
*Assistant Examiner* — Jacqueline Brazin
(74) *Attorney, Agent, or Firm* — Foley & Lardner LLP

(57) ABSTRACT

Disclosed are a detection method and detection system using suspension liquid biochip detection. The detection method using suspension liquid biochip comprises the following steps: an excitation step and a signal acquisition step. In the excitation step, a laser light emitted by a single laser device is used to excite a classification fluorescence of nanocrystalline fluorescent microspheres and a report fluorescence of an object to be detected; and in the signal acquisition step, fluorescence detection signals are obtained through multiple acquisition channels, respectively. In the present invention, the classification fluorescence in the nanocrystalline fluorescent microspheres and the report fluorescence in the object to be detected in a sample are excited by a single laser device, which is convenient for operation and reduces the production cost of the system, thereby reducing the detection cost.

9 Claims, 13 Drawing Sheets

(58) Field of Classification Search
CPC ............. G01N 21/645; G01N 35/0099; G01N 2021/6441; B01L 9/50
USPC ........................................................ 422/500
See application file for complete search history.

(56) References Cited

U.S. PATENT DOCUMENTS

| | | | | |
|---|---|---|---|---|
| 2003/0151735 | A1* | 8/2003 | Blumenfeld | G01N 21/6428 356/73 |
| 2007/0269342 | A1* | 11/2007 | Kitagawa | G01N 35/04 422/64 |
| 2013/0037727 | A1* | 2/2013 | Maeda | G01N 21/77 250/458.1 |
| 2015/0198621 | A1 | 7/2015 | Ootani et al. | |
| 2019/0076845 | A1* | 3/2019 | Huber | B65G 54/025 |

FOREIGN PATENT DOCUMENTS

| | | |
|---|---|---|
| CN | 101228430 A | 7/2008 |
| CN | 101672848 A | 3/2010 |
| CN | 106645067 A | 5/2017 |
| CN | 108340381 A | 7/2018 |
| CN | 110554178 A | 12/2019 |
| CN | 110554194 A | 12/2019 |

OTHER PUBLICATIONS

Robert Wilson, et al., "Encoded Microcarriers for High-Throughput Multiplexed Detection"(Angewandte Chemie International Edition, vol. 45, No. 37, Sep. 18, 2006 (Sep. 18, 2006), pp. 6104-6117, XP055132213, ISSN: 1433-7851, DOI: 10.1002/anie. 200600288).
International Search Report for PCT/CN2020/086225, dated Jul. 28, 2020. (10 pages).
Wang, Gang et al., "Highly Efficient Preparation of Multiscaled Quantum Dot Barcodes for Multiplexed Hepatitis B Detection," ACS Nano, 7(1):471-481, 2013. (11 pages).
Wang, Xiebing et al., "NIR-Emitting Quantum Dot-Encoded Microbeads through Membrane Emulsification for Multiplexed Immunoassays," Small, 9(19):3327-3335, 2013. (10 pages).
Decision of Rejection dated Nov. 14, 2024, received in Chinese Patent Application No. 2019103293261.

* cited by examiner

DETECTION METHOD AND DETECTION SYSTEM USING SUSPENSION LIQUID BIOCHIP

FIELD OF THE INVENTION

Disclosed are a detection method and a detection system using suspension liquid biochip.

DESCRIPTION OF THE PRIOR ART

Biochip technology is a high-throughput biomolecular detection technology integrating microelectronics, life sciences, computer science and photo-electrochemistry, and is a major revolution in the field of life sciences. The traditional form of biochip technology is also called microarray technology. Its principle is to integrate biomolecules (DNA, RNA, peptides, proteins, etc.) with known sequences on a solid surface to form a probe array. Labeled biomolecules to be detected are used for hybridization reaction with the above probe array, and the purpose of biomolecule detection is achieved by detecting the hybridization probe at the corresponding position. The traditional biochip hybridization belongs to solid-liquid phase hybridization, and its discrete solid-liquid reaction environment and washing factors shows some shortcomings in detection sensitivity and detection of rare samples.

Suspended liquid biochip is a new high-throughput multiple detection technology that integrates molecular biology, immunology, polymer chemistry, optical detection technology, microfluidic technology, and computer technology based on SAT (Suspension ArrayTechnology). This technology well overcomes the technical shortcomings of solid state array chips, and has advantages such as high throughput, multiple indicators, high sensitivity (~0.01 pg/mL), high specificity, wide linear range (up to 3~5 orders of magnitude), fast response (20~40 min), good repeatability and easy operation and so on compared with other detection methods. Therefore, it is currently the only biochip technology and product approved by the US Food and Drug Administration (FDA) for clinical diagnosis. Its application in clinical diagnosis have involved immunological analysis, DNA hybridization analysis, and molecule detection of protein and gene expression profile and other fields. Biochip technology is considered to be the key development direction of clinical medical testing, so it has been included in National Science and Technology Innovation Plan of China's "13th Five-Year" for in vitro diagnostic technologies that require breakthroughs.

At present, the existing commercial liquid biochip products still have technical problems to be solved: 1) the fluorescent dyes used in the existing liquid biochip microspheres on the market are mostly organic dyes and when multicolor labeling is performed, the wide emission peaks make the signals easy to overlap and difficult to distinguish; 2) the poor light stability of organic fluorescent dyes and the poor ability of organic fluorescent dyes to resist fluorescent bleaching would affect their service life or storage period; 3) the classification fluorescence on the microsphere probe and the report fluorescence of the molecule to be test in the sample must be excited by laser devices with two different wavelengths, which leads to a higher cost of the detection instrument; 4) this type of detection instrument has only two detection channels, and also has strict requirements on the size of the microspheres (around 5.6 μm), thus the fluorescence signal parameter setting is greatly restricted, which is not conducive to the future needs and applications for high-throughput and rapid clinical testing.

At present, the conventional method using suspension liquid biochip has a relatively expensive system and a high cost for a single test sample, and difficult for application. Therefore, there is an urgent need for a low-cost and easy-to-operate detection technology using suspension liquid biochip in practical applications.

SUMMARY OF THE INVENTION

One of the objectives of the present invention is to overcome the deficiencies in the prior art and provide a detection method using suspension liquid biochip and a detection system using suspension liquid biochip.

In order to achieve the above objectives, the present invention is achieved through the following technical solutions:

The detection method using suspension liquid biochip is characterized in that the detection method comprises the steps:

excitation step, in the excitation step a laser light emitted by a single laser device is used to excite a classification fluorescence of nanocrystalline fluorescent microspheres and a reporter fluorescence of an object to be detected;

signal acquisition step, in the signal acquisition step fluorescence detection signals are obtained through multiple acquisition channels, respectively.

According to an embodiment of the present invention, the wavelength of the laser light emitted by the single laser device is 400-600 nm.

According to an embodiment of the present invention, lasers of the same wavelength are used to simultaneously excite the classification fluorescence of the nanocrystalline fluorescent microspheres and the report fluorescence of the object to be detected.

According to an embodiment of the present invention, the classification fluorescence is fluorescence of at least one or more wavelengths.

According to an embodiment of the present invention, the classification fluorescence includes fluorescence of more than two wavelengths.

According to an embodiment of the present invention, the report fluorescence of the object to be detected is realized via the excitation of a fluorescent dye by the laser; the fluorescent dye is one or more of fluorescein isothiocyanate, phyllochlorin, phycoerythrin, anthocyanin, or surface-modified semiconductor quantum dots.

Fluorescein isothiocyanate is abbreviated as FITC; phyllochlorin is abbreviated as PerCP; phycoerythrin is abbreviated as PE; anthocyanin is abbreviated as CY5.

According to an embodiment of the present invention, in the signal acquisition step, the acquisition channel includes one or more of FSC, FL1, FL2 and FL3.

According to an embodiment of the present invention, wherein two of the acquisition channels are used to acquire the signals of the classification fluorescence.

According to an embodiment of the present invention, one of the acquisition channels is used to acquire the signal of the report fluorescence.

According to an embodiment of the present invention, after the signal acquisition step, a result calculation step is further included, and the following steps are sequentially included in the result calculation step: a. the signals acquired by the FSC channel are made into a histogram, and the data in a selected range near a peak value are selected, and the signal data related to the fluorescent microspheres within the selected data range are used in the next calculation; b. the acquired signals of the classification fluorescence corresponding to the nanocrystalline fluorescent microspheres selected in step a are used to make a classification fluorescence scatter diagram; c. an effective area for the scatter diagram of each nanocrystalline fluorescent microsphere is selected, and the corresponding data in the effective area are selected; d. a report fluorescence signal distribution histogram of the nanocrystalline fluorescent microspheres in the effective area selected in step c is made and a peak value data corresponding to the report fluorescence signals acquired from these nanocrystalline fluorescent microspheres is selected, and a median value of the result data is calculated; e. a concentration result corresponding to an intensity of the report fluorescence signals is obtained through a standard curve.

According to an embodiment of the present invention, the classification fluorescence signals of each type of nanocrystalline fluorescent microsphere are pre-coded before the detection in the step b.

According to an embodiment of the present invention, in the step d, for particle cluster of each type of nanocrystalline fluorescent microsphere in the effective area, the peak value data of the report fluorescence signal is calculated by the area under the signal curve, the median value of the result data is calculated, and the intensity of the report fluorescence signal is obtained.

A detection system using suspension type liquid biochip is characterized in that it includes a housing; the housing encloses a chamber; a clamp is installed on the housing, and the clamp is used to clamp a tube; the clamp is rotatably arranged on the housing, and the clamp is provided with a first clamping hole and a second clamping hole; the first clamping hole is used to fix a first tube, and the second clamping hole is used to clamp a second tube; the axis of the first clamping hole intersects the axis of the second clamping hole; the clamp is rotatably arranged, and when the clamp rotates, the opening of the first tube or the opening of the second tube faces a direction suitable for use.

According to an embodiment of the present invention, the axis of the first clamping hole is perpendicular to the axis of the second clamping hole.

According to an embodiment of the present invention, the clamp includes a base and a plurality of clamping jaws, and the plurality of clamping jaws are arranged in two horizontal columns and arranged in two vertical rows on the base; the two horizontal columns are arranged at intervals, and the first clamping hole is located between the two horizontal columns; the two vertical rows are arranged at intervals, and the second clamping hole is arranged between the two vertical rows.

According to an embodiment of the present invention, the number of the clamping jaws is four, and the four clamping jaws are arranged on the base at intervals according to a rectangular distribution; the four clamping jaws form two vertical rows and two horizontal columns; the two vertical rows of clamping jaws are used to clamp the first tube; the two horizontal columns of clamping jaws are used to clamp the second tube.

According to an embodiment of the present invention, the base is rotatably mounted on the housing.

According to an embodiment of the present invention, the base comprises a connecting post, a plurality of catch grooves are provided on the surface of the connecting post; the plurality of catch grooves are distributed along the circumferential direction; the connecting post is rotatably installed on the housing;

the housing is further provided with a restricting member and the restricting member is movably arranged;

When the restricting member moves, the end of the restricting member can be inserted into the catch groove and can be configured to be able to withdraw from the catch groove; when the end of the restricting member is inserted into the catch groove, the rotation of the connecting post is restricted; after the end of the restricting member withdraws from the catch groove, the restriction on the connecting post is released;

when the connecting post rotates against the restricting member, the restricting member can move to make the end exit the catch groove and when the next catch groove rotates to be opposite to the end of the restricting member, the end of the restricting member is inserted into the catch groove.

According to an embodiment of the present invention, it further includes an elastic reset device, the elastic reset device is configured to deform when the restricting member moves; the elastic reset device is used to reset the restricting member.

According to an embodiment of the present invention, the elastic reset device is pre-deformed to generate an elastic force, the elastic force keeps the end of the restricting member in a state of being inserted into the catch groove; when the restricting member moves, the deformation of the spring is greater.

According to an embodiment of the present invention, the restricting member is provided with a recess, and the elastic reset device is a cylindrical spring; one end of the cylindrical spring abuts against the recess, and the other end abuts against the housing.

According to an embodiment of the present invention, a mounting plate is arranged in the recess, the mounting plate is provided with a positioning post, and the end of the cylindrical spring is sleeved on the positioning post and abuts against the mounting plate.

According to an embodiment of the present invention, the positioning post is cross-shaped, and the positioning post is further provided with a convex column, the convex column is inserted into the cylindrical spring and thus connects the cylindrical spring with the positioning post.

According to an embodiment of the present invention, the housing is provided with a transparent plate through which the chamber can be observed.

According to an embodiment of the present invention, the housing is provided with an openable and closable door plate; the door plate is opposite to the cleaning liquid bottle provided in the chamber, and the cleaning liquid bottle can be taken out or put in after opening the door plate; the transparent plate is arranged on the door plate.

The classification fluorescence of the present invention is the fluorescence emitted by the nanocrystalline fluorescent microspheres after being excited by laser, and is used for encoding to distinguish different nanocrystalline fluorescent microspheres.

Report fluorescence is fluorescence used to mark a object to be tested for the detecting instrument to detect the presence of the object to be tested and the content of the object to be tested.

According to an embodiment of the present invention, the optical path system is provided with a single laser device.

Compared with the prior art, the present invention has the following beneficial effects:
1) Nanocrystalline fluorescent microspheres with narrow emission peak width and controllable particle size are used; it is convenient to use different wavelengths of fluorescence and/or use different wavelengths of fluorescence together with the particle size of the microspheres to optically encode the nanocrystalline fluorescent microspheres to distinguish different nanocrystalline fluorescent microspheres.
2) The classification fluorescence in the nanocrystalline fluorescent microspheres and the report fluorescence in the object to be detected in the sample are excited by a single laser device, which is convenient for operation and reduces the production cost of the system, thereby reducing the detection cost.
3) This method can provide multiple detection channels to obtain a larger number of fluorescent signals and facilitate more encoding of nanocrystalline fluorescent signals.
4) The clamp can be configured rotatably, can clamp different tubes and is easy to use.

DETAILED DESCRIPTION OF THE PREFERRED EMBODIMENTS

Example 1

Figure 1:
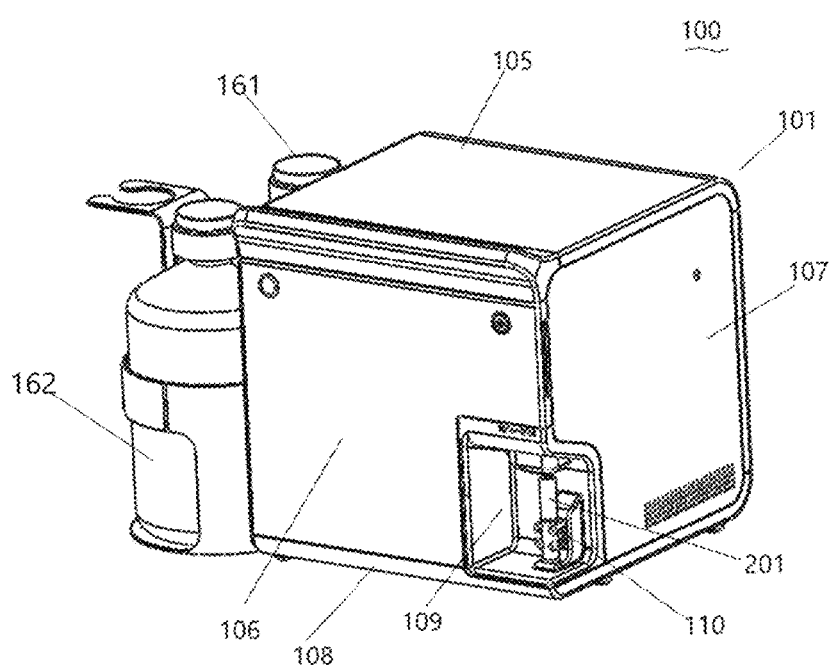
FIG. 1 is a schematic diagram of the structure of the detection system using suspension liquid biochip in the present invention.

As shown in FIG. 1, a detection system 100 using suspension liquid biochip includes a liquid path system, an optical path system, a detection and analysis component, and a housing 101. The liquid path system includes structures such as a sheath liquid barrel 161 and a waste liquid barrel 162. The liquid path system can use the structure in the prior art, which would not be repeated here. In the present invention, the optical path system can adopt the corresponding structures in the prior art except that only one laser device is provided. The optical path system in the present invention is provided with a single laser device (not shown in the figure). The single laser device is used to emit a laser of a selected wavelength, for example, a 488 nm laser light. The specific laser wavelength range can be determined according to actual needs. The detection and analysis component can also adopt the corresponding structure in the prior art.

As shown in FIGS. 1 to 6, the housing 101 is composed of an upper cover 105, a front door 106, two side wall plates 107, a bottom plate 108 and a rear wall plate (not shown in the figure). The housing 101 encloses a cavity 102. A recess 109 is provided on one corner of the housing 101. A mounting hole (not shown in the figure) is provided in the recess 109. The mounting hole is used for mounting a clamp 110 described later.

Figure 2:
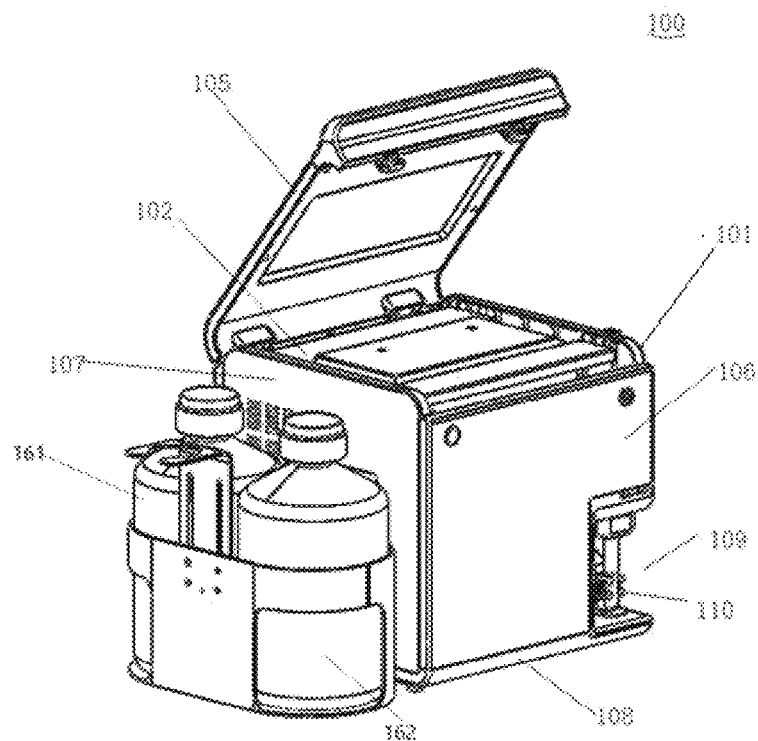
FIG. 2 is a schematic diagram of the structure of the detection system using suspension liquid biochip with the upper cover opened.
Figure 3:
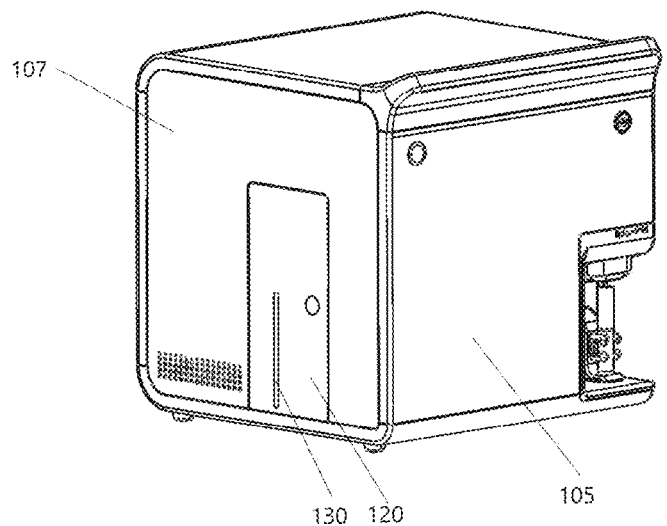
FIG. 3 is a schematic diagram viewed from another angle of the structure of the detection system using suspension liquid biochip.
Figure 4:
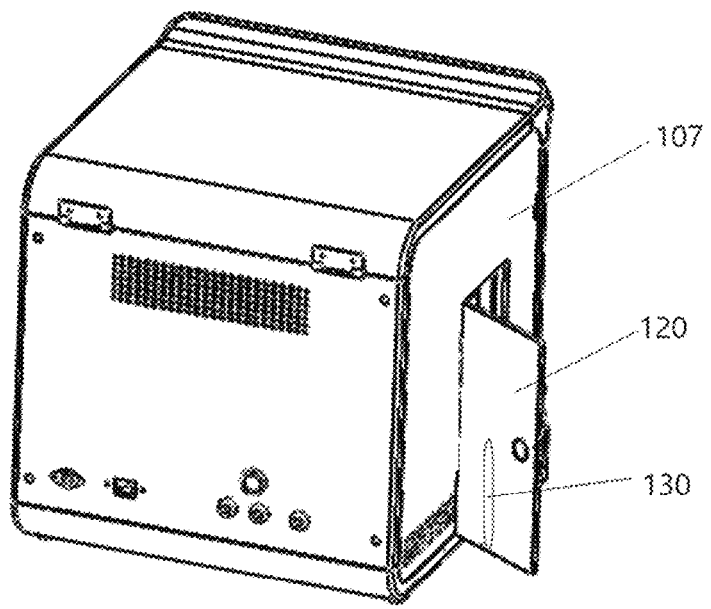
FIG. 4 is a schematic diagram of the structure of the detection system using suspension liquid biochip with the door plate opened.
Figure 5:
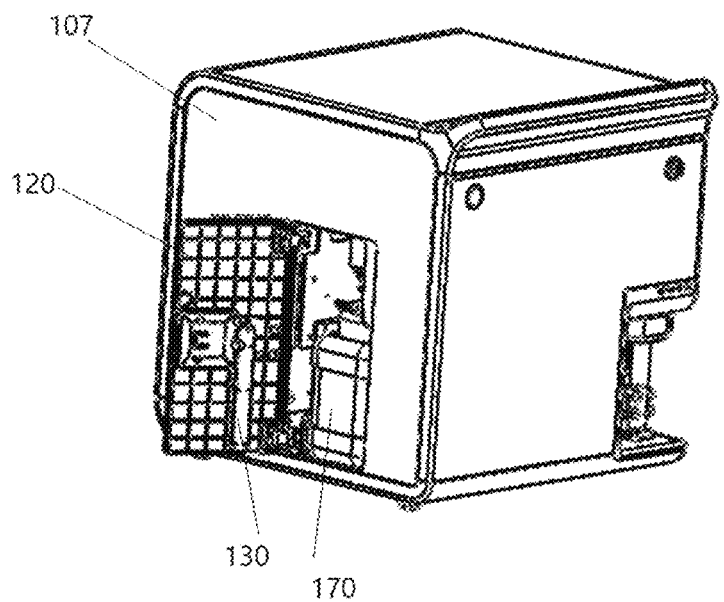
FIG. 5 is a schematic diagram viewed from another angle of the structure of the detection system using suspension liquid biochip with the door plate opened.
Figure 6:
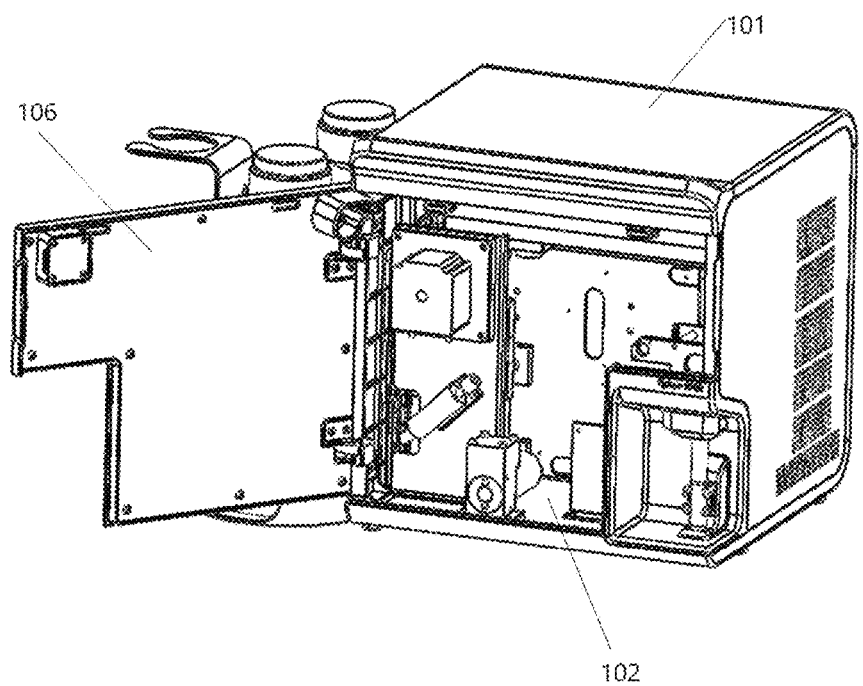
FIG. 6 is a schematic diagram of the structure of the detection system using suspension liquid biochip with the front door opened.
Figure 7:
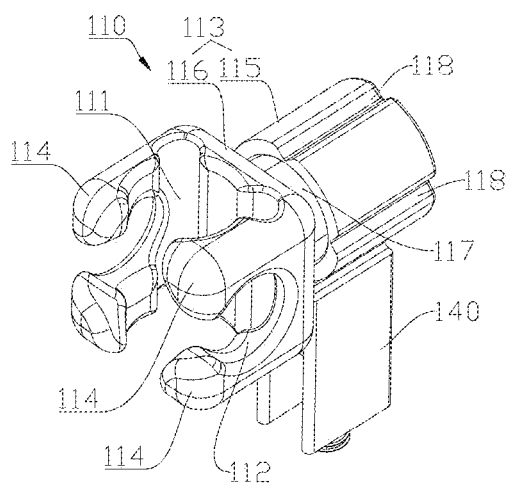
FIG. 7 is a schematic diagram of the structure of the clamp and the restricting member in the present invention.
Figure 8:
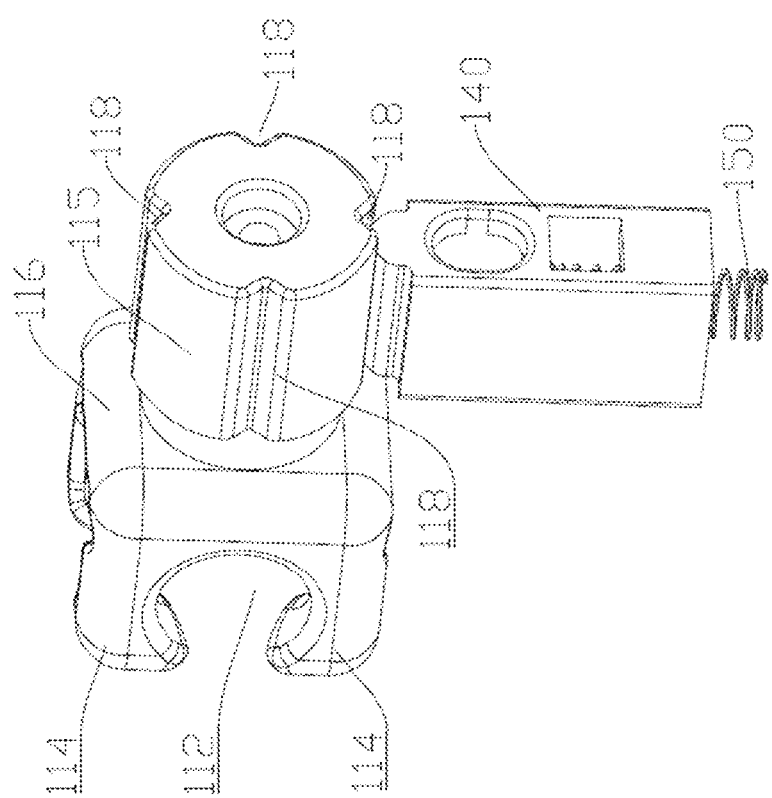
FIG. 8 is a schematic diagram viewed from another angle of the structure of the clamp and the restricting member in the present invention.

As shown in FIG. 2, the upper cover 105 is configured to be openable. After the upper cover 105 is opened, detection can be performed. As shown in FIG. 3, FIG. 4 and FIG. 5, one of the side wall plates 107 is provided with an openable and closable door plate 120; the door plate 120 is opposite to the cleaning liquid bottle 170 provided in the chamber 102, and the cleaning liquid bottle can be taken out or put in after opening the door plate 120. The door plate 120 is provided with a transparent plate 130 through which the cleaning liquid in the cleaning liquid bottle inside the chamber 102 can be observed. The transparent plate 130 has a strip shape extending vertically. As shown in FIG. 6, the front door 106 is configured to be openable.

As shown in FIG. 7 to FIG. 11, a restricting member 140 is provided in the chamber 102. The restricting member 140 has a substantially cuboid shape. The restricting member 140 has one end 141. The restricting member 140 is also provided with a recess 142. The recess 142 is used for accommodating a part of the cylindrical spring 150, which can ensure that the cylindrical spring 150 is installed more stably and more securely during use. A mounting plate 143 is provided in the recess 142. A positioning post 144 is provided on the mounting plate 143. The positioning post 144 is cross-shaped. A convex column 145 is also provided on the positioning post 144. The restricting member 140 is configured to be movable up and down. The restricting member 140 is connected with a cylindrical spring 150. One end of the cylindrical spring 150 is sleeved on the positioning post 144 and abuts against the mounting plate 143. The convex column 145 is inserted into the cylindrical spring 150 to clamp the cylindrical spring 150, so that the connection between the positioning post 144 and the cylindrical spring 150 is more stable. The other end of the cylindrical spring 150 is abutted against the inside of the housing 101. When the restricting member 140 moves downward, the cylindrical spring 150 can generate elastic force due to deformation. The elastic force can make the restricting member 140 move upward and reset.

The inspection system 100 in the present invention further includes clamp 110. The clamp 110 is used to clamp a tube. The clamp 110 is provided with a first clamping hole 111 and a second clamping hole 112. The first clamping hole 111 is used for a first tube 201 inserting. The second clamping hole 112 is used for a second tube inserting (not shown in the figure). The axis of the first clamping hole 111 and the axis of the second clamping hole 112 intersect, and preferably the axes of the two intersect perpendicularly.

The clamp 110 includes a base 113 and four clamping jaws 114. The base 113 includes a connecting post 115, a bottom plate 116 and a connecting rod 117. The bottom plate 116 and the connecting post 115 are connected by the connecting rod 117. A catch groove 118 is provided on the surface of the connecting post 115. There are a plurality of catch grooves 118 evenly distributed along the circumferential direction. In the example shown in the figure, four catch grooves 118 are provided, which are evenly distributed along the circumferential direction.

The four clamping jaws 114 are arranged on the bottom plate 116 in a rectangular distribution and at intervals, and protrude from the bottom plate 116. The four clamping jaws 114 form two vertical rows and two horizontal columns. The gap between the two horizontal columns of clamping jaws 114 is a first clamping hole 111 for clamping the first tube 201. The gap between the two vertical rows of clamping jaws 114 is a second clamping hole 112 for clamping the second tube (not shown in the figure).

The connecting post 115 of the clamp 110 is inserted in the mounting hole and can rotate. The connecting post 115 is located above the end 141 of the restricting member 140. The end 141 of the restricting member 140 can be inserted into the catch groove 118 to limit the rotation of the connecting post 115. The end 141 of the restricting member 140 can also be withdrawn from the catch groove 118 to release the restriction on the connecting post 115. The cylindrical spring 150 is pre-compressed to generate elastic force, and the elastic force keeps the end 141 of the restricting member 140 in the catch groove 118. When the clamp 110 needs to be rotated, the base 113 is rotated forcefully, and the connecting post 115 presses the end 141 of the restricting member 140 so that the end 141 exits the catch groove 118. During the rotation of the connecting post 115, until the other catch groove 118 rotates above the end 141 of the restricting member 140, the elastic force of the cylindrical spring 150 causes the restricting member 140 to move upward and reset until the end 141 is inserted into the catch groove 118, and The connecting post 115 is restricted to this state. The arc between the two catch groove 118 is 90 degrees, and the connecting post 115 is clamped every time it rotates 90 degrees. During the rotation of the clamp 110, the opening of the first tube 201 clamped by the clamp 110 or the opening of the second tube clamped by the clamp 110 may face a direction suitable for use, such as upward. The connecting post 115 is provided with a catch groove 118 to cooperate with the end 141 of the restricting member 140. When different tubes are installed, it only needs to be rotated to make the opening of the tube suitable for operation, which is convenient to use. The cylindrical spring 150 helps to stably restrict the connecting post 115, which can prevent connecting post 115 from loosening and allow connecting post 115 to rotate. Therefore, the clamp 110 is provided with the first clamping hole 111 and the second clamping hole 112, which can clamp a test tube or a centrifuge tube and other different tubes, which is more convenient to use.

Example 2

The detection method using suspension liquid biochip uses the detection system 100 using suspension liquid biochip in Example 1, and includes the following steps:
Step 1: sample collection, serum samples to be tested are collected.

Step 2: single cell suspension preparation; the preparation method includes: enzymatic digestion method and/or mechanical method and/or chemical reagent treatment method. This preparation method is the prior art, and would not be repeated here.

Step 3. Labeling step: nanocrystalline fluorescent microspheres are labeled with antibody; firstly, two differently encoded nanocrystalline fluorescent microspheres with a particle size of 5 μm are selected. Nanocrystalline fluorescent microspheres emit fluorescence of at least one wavelength under laser excitation, nanocrystalline microspheres that emit fluorescence of two wavelengths, such as 520 nm and 680 nm are preferred. The fluorescence of the two wavelengths of the nanocrystalline fluorescent microspheres are combined in different proportions to jointly form the code of the nanocrystalline fluorescent microspheres. Each code represents one type of microsphere. For example, after excitation of one type of the nanocrystalline fluorescent microspheres, the fluorescence intensity with an emission peak wavelength of 520 nm is 10%, and the fluorescence intensity with an emission peak wavelength of 680 nm is 90%. After excitation of another type of the nanocrystalline fluorescent microspheres, the fluorescence intensity with an emission peak wavelength of 520 nm is 30%, and the fluorescence intensity with an emission peak wavelength of 680 nm is 70%. By exciting the fluorescence of the nanocrystalline fluorescent microspheres, a detecting instrument is used to collect the above fluorescence signals for calculation, and different nanocrystalline fluorescent microspheres can be distinguished.

In this example, two types of nanocrystalline fluorescent microspheres are used, both of which are coded by fluorescence; the surface of one type of the nanocrystalline fluorescent microspheres is coupled to the anti-alpha-fetoprotein antibody AFP-Ab; the other type of the nanocrystalline fluorescent microspheres is coupled to the anti-carcinoembryonic antigen antibody CEA-Ab, which respectively form two biological detection probes for specific detection of alpha-fetoprotein AFP and specific detection of carcinoembryonic antigen CEA. These two biological detection probes are added to the serum sample to react.

Finally, the target connected to the biological detection probe is labeled with two phycoerythrin fluorescein which are respectively coupled with specific antibodies against the AFP and CEA antigens. Here, the specific antibodies respectively coupled with AFP and CEA antigens are used as secondary antibodies. The fluorescence emitted by the phycoerythrin fluorescein excited by the laser is the report fluorescence of the object to be detected. Phycoerythrin fluorescein emits fluorescence with a wavelength of 575 nm after being excited by laser.

Step 4. Excitation step: the nanocrystalline fluorescent microspheres obtained in step 3 are excited by a single laser device, and the fluorescence signal is detected by a detecting instrument. The detecting instrument is a single-light three-color detecting instrument, i.e. the detecting instrument has a single laser device and collects fluorescence signals of three wavelengths. Moreover, in this example, the single laser device emits laser light of the same wavelength to excite classification fluorescence and report fluorescence, i.e. three different wavelengths of fluorescence are excited. In this example, the wavelength of the laser light emitted by the laser device is 488 nm.

Step 5: Signal acquisition step: classification fluorescence and report fluorescence detection signals are obtained through multiple acquisition channels, wherein the acquisition channels include one or more of FSC, FL1, FL2, and FL3. The selected specific number can be determined according to the number of fluorescence wavelengths. In addition to the FSC channel, at least two of the acquisition channels are used to acquire the classification fluorescence signals of the nanocrystalline fluorescent microspheres. In this example, the FSC channel acquires fluorescence signals related to the particle size of the nanocrystalline fluorescent microspheres, and the other two channels (FL1 and FL2) acquire fluorescence signals around 520 nm and 680 nm, respectively. 520 nm and 680 nm fluorescence are classification fluorescence and used to detect different nanocrystalline fluorescent microspheres. The acquisition channel FL3 is used to acquire the signal of the report fluorescence, i.e. to acquire the fluorescence signal near 575 nm.

Figure 9:
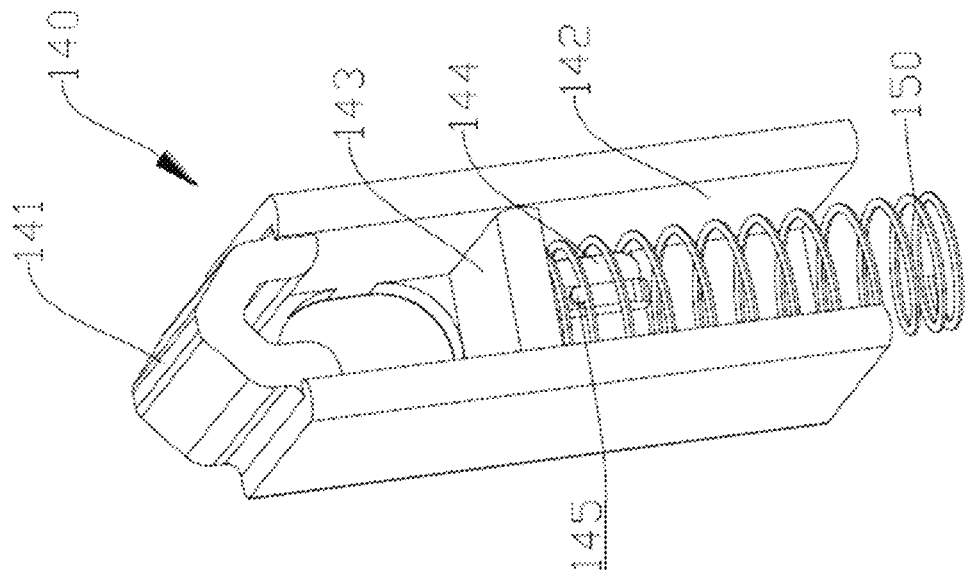
FIG. 9 is a schematic diagram of the structure of the restricting member and the cylindrical spring in the present invention.
Figure 10:
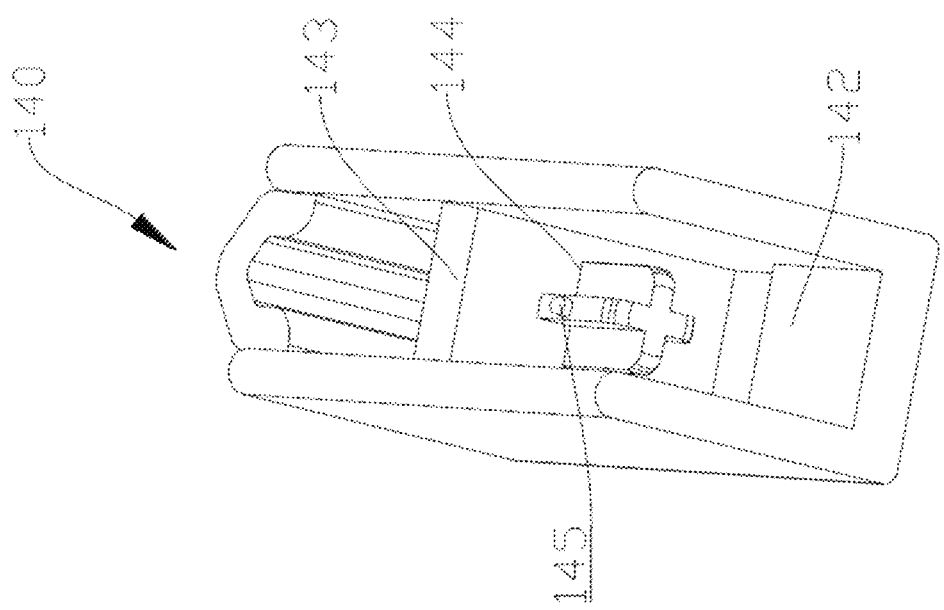
FIG. 10 is a schematic diagram of the structure of the restricting member in the present invention.
Figure 11:
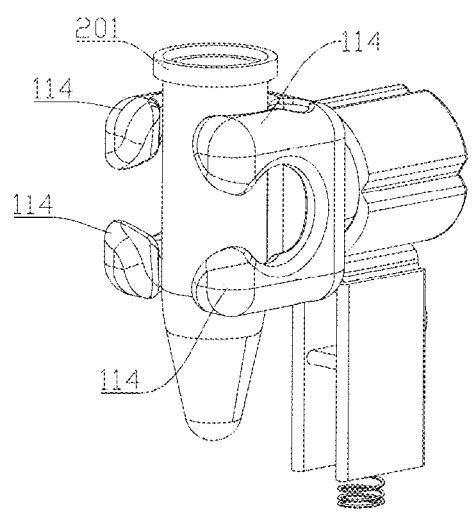
FIG. 11 is a schematic diagram of a state of use of the clamp in the present invention.
Figure 12:
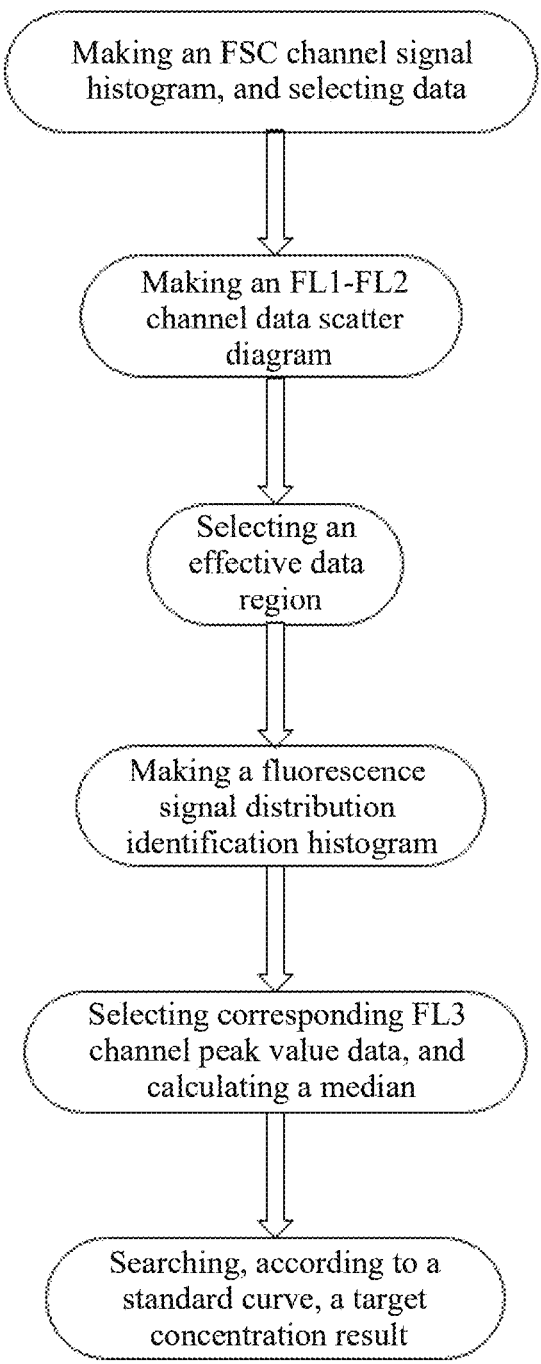
FIG. 12 is a schematic diagram of the flow of the calculation step for the result in the present invention.
Figure 13:
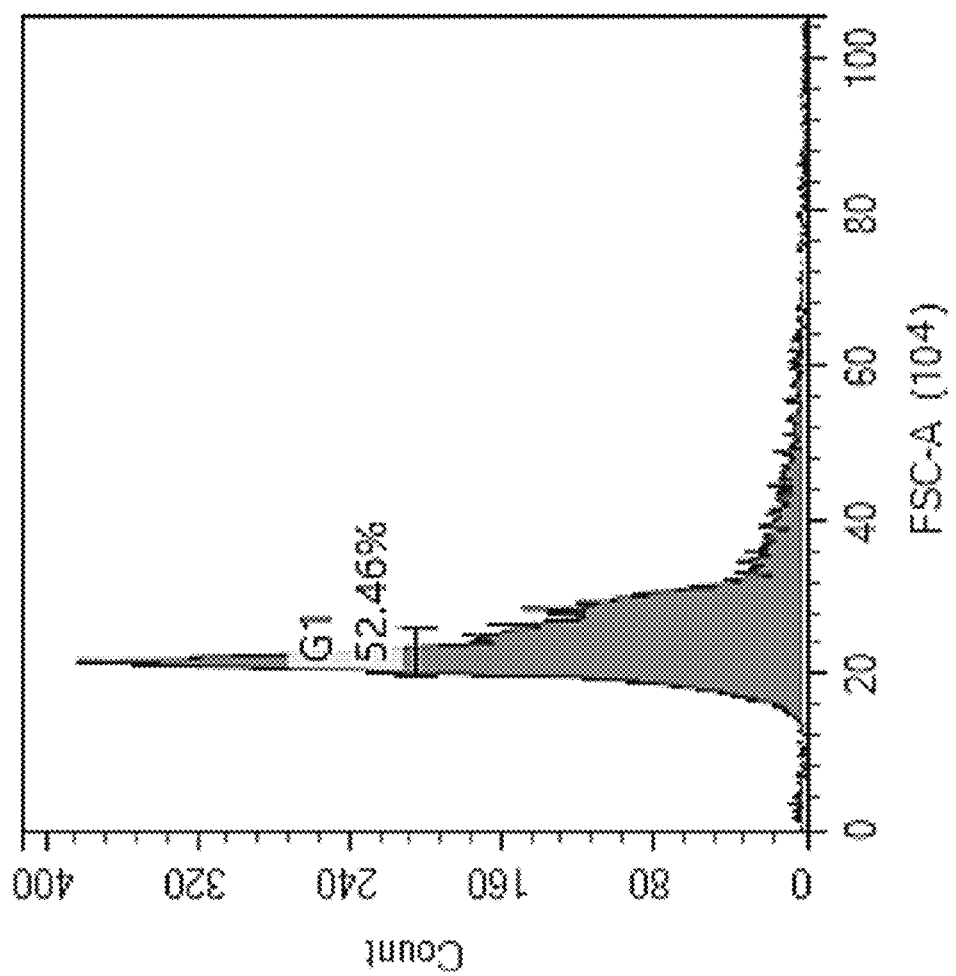
FIG. 13 is a histogram made from the data acquired by the FSC channel.
Figure 14:
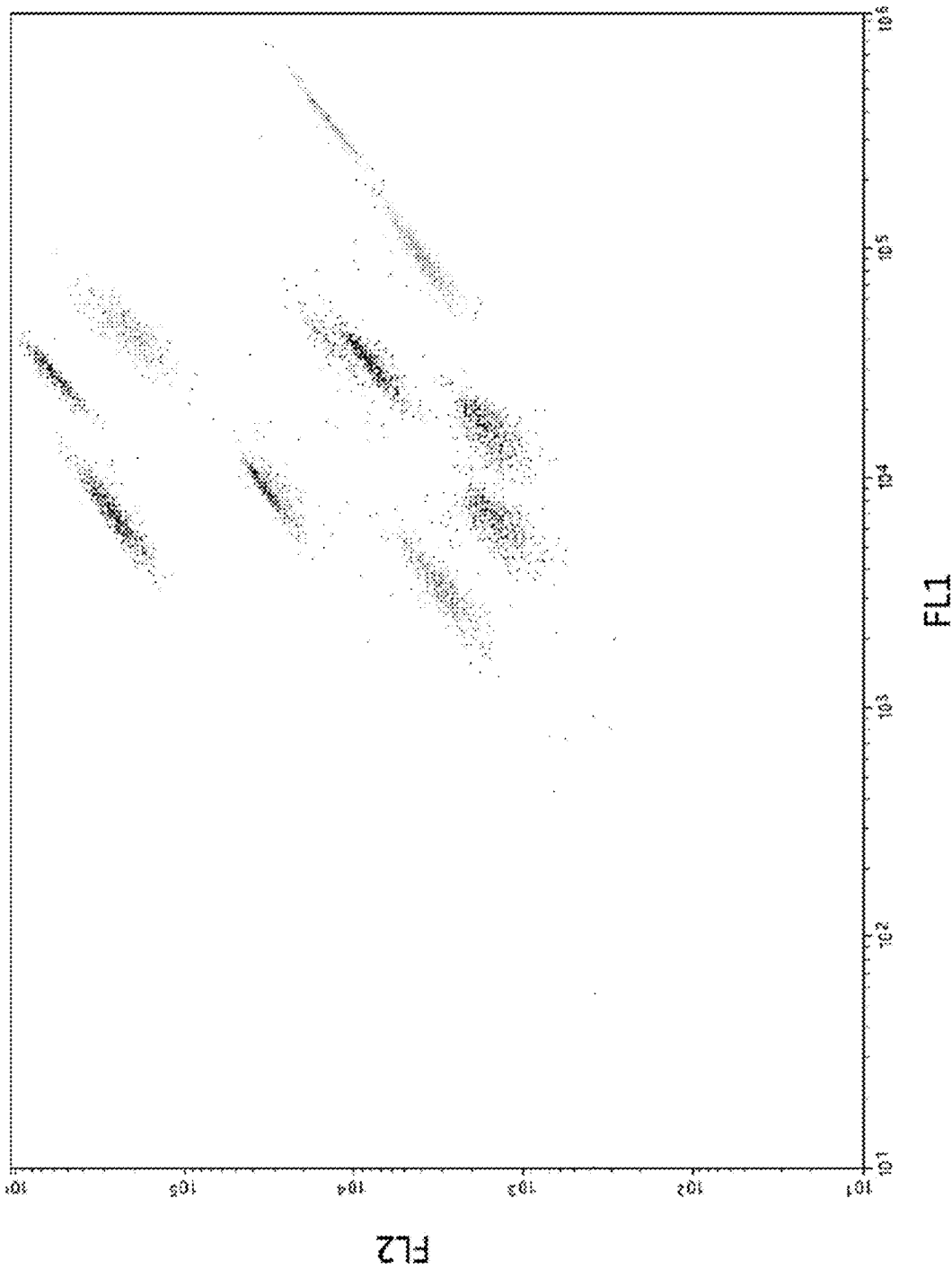
FIG. 14 is a schematic diagram of the FL1-FL2 scatter diagram.
Figure 15:
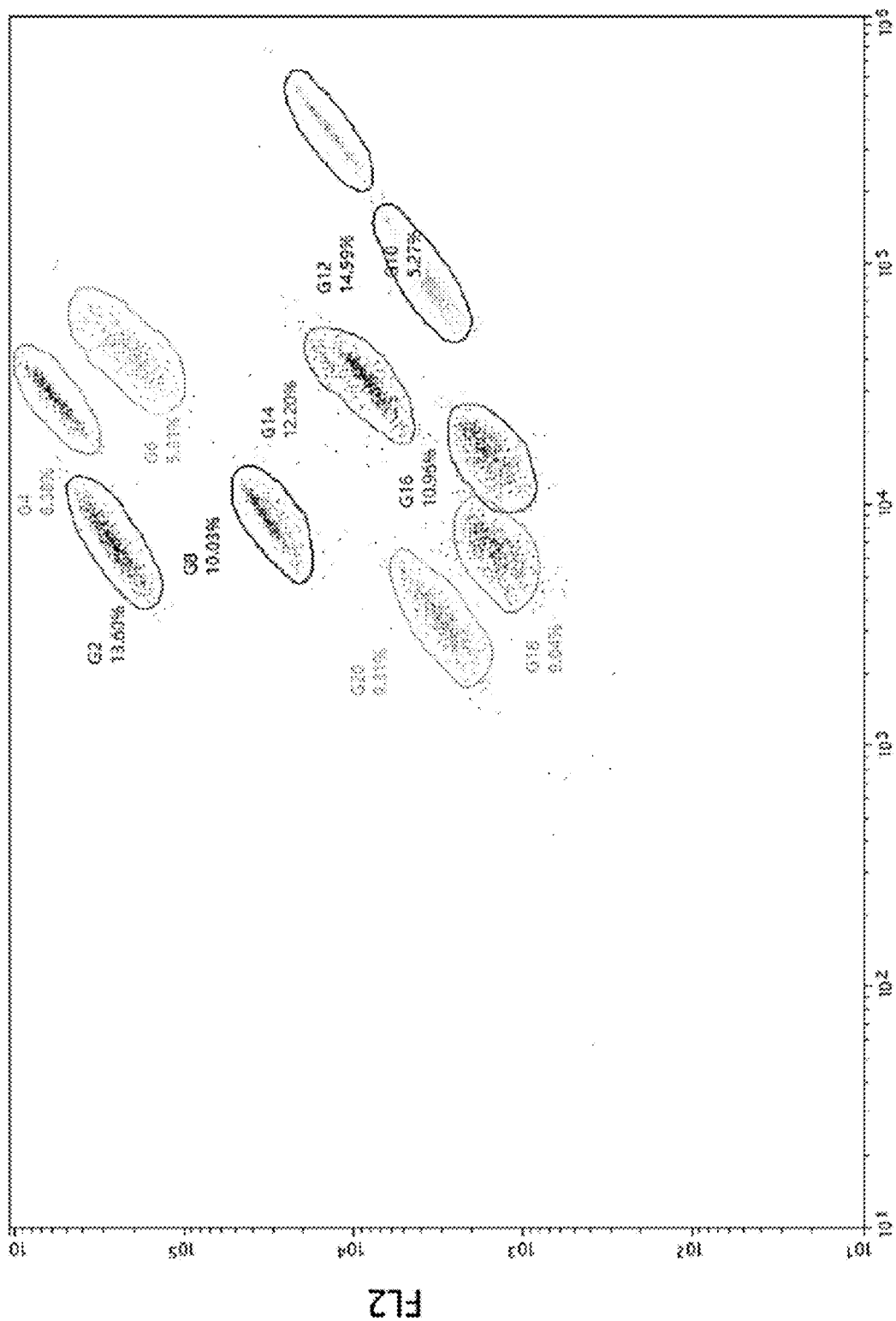
FIG. 15 is a schematic diagram of the effective area selected from the scatter diagram in FIG. 14.
Figure 17:
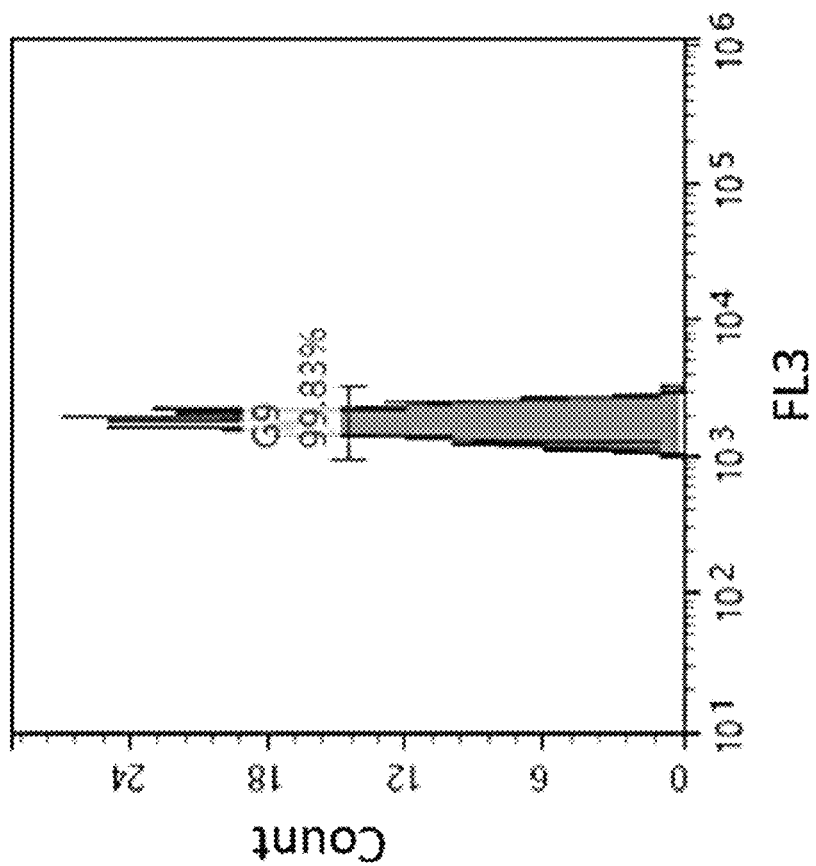
FIG. 17 is the result data area of FL3-A corresponding to the G8 area in FIG. 15, denoted as G9.
Figure 16:
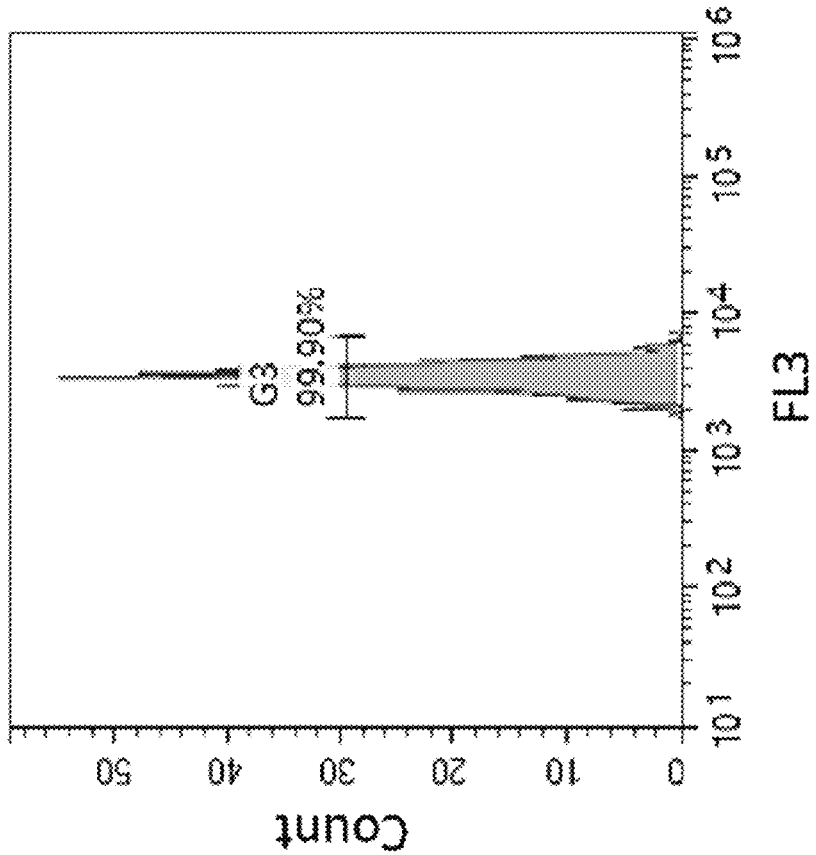
FIG. 16 shows the result data area of FL3-A corresponding to the G2 area in FIG. 15, denoted as G3.

Step 6. Result calculation steps: the result calculation process is shown in FIG. 12, including the following steps:

a. As shown in FIG. 13, the signal acquired by the FSC channel is made into a histogram, and the data in the selected range near the peak value is selected. In this step, only the signals in the area that meet the requirements are selected for the detected signals; the particle size of the nanocrystalline microspheres can be determined by the signals; the signals related to microspheres with relatively small or too large relative to 5 μm, such as less than 2 μm or larger than 8 μm are not used. The identification signal data related to the fluorescent microspheres within the selected data range is used in the next calculation.

b. The acquired signals of the classification fluorescence corresponding to the nanocrystalline fluorescent microspheres selected in step a are used to make the classification fluorescence scatter diagram as shown in FIG. 14, i.e. the scatter diagram of signals acquired by the FL1-FL2 acquisition channels. In FIG. 14, a total of ten particle cluster distribution regions are obtained, wherein in two particle cluster distribution regions, the microspheres in the G2 region as shown in FIG. 15 are coupled with a biological detection probe that specifically detects alpha-fetoprotein AFP; the microspheres in the G8 region as shown in FIG. 9 are coupled with a biological detection probe that specifically detects carcinoembryonic antigen CEA.

c. The effective data area of the two coded microspheres is used in this example, i.e., the effective data area of the particle cluster. As shown in the G2 and G8 areas in FIG. 15, the circles in the figure represent the selected effective area, and the signals corresponding to the nanocrystalline fluorescent microspheres outside this area are not considered. Effective data according to each nanocrystalline fluorescent microsphere area is obtained. For different items to be detected, only the corresponding data in the corresponding effective data area is used for calculation. According to the density distribution of the data in the effective range, the distribution map of the coded microsphere particle cluster is obtained.

d. A report fluorescence signal distribution histogram of the nanocrystalline fluorescent microspheres in the effective area selected in step c is made and the corresponding FL3 channel peak value data is selected. For each particle cluster that encodes the microsphere, the data corresponding to the FL3-A channel is selected, the median value of the result data is calculated, and the fluorescence intensity of the detection item is obtained. FIG. 16 shows the result data area of FL3-A corresponding to the G2 area in FIG. 15, denoted as G3; FIG. 17 is the result data area of FL3-A corresponding to the G8 area in FIG. 15, denoted as G9.

e. The corresponding concentration results of the FL3-A fluorescence intensity of G3 are searched through the standard curve, and then the concentration of the corresponding detection object AFP is 0.25 ng/mL. The corresponding concentration results of the FL3-A fluorescence intensity of G9 are searched through the standard curve and then the concentration of the corresponding detection object CEA is 0.14 ng/mL.

In the above example, only two wavelengths of fluorescence are combined in different proportions for encoding. According to the technical solution of the present invention, the particle size of the nanocrystalline fluorescent microspheres can also be used for encoding. For example, a particle size of 5 μm, a particle size of 10 μm, and a particle size of 15 μm, plus two or more wavelengths of fluorescence. In this way, more codes can be realized to distinguish more microspheres, and more targets can be detected at the same time in the same batch.

The above are only preferred examples of the present invention, and are not used to limit the protection scope of the present invention. Any modification, equivalent replacement or improvement within the spirit of the present invention is covered by the scope of the claims of the present invention.

The invention claimed is:

1. A detection system using a suspension liquid biochip, comprising:
a detection and analysis component, and a housing;
wherein the housing comprises an upper cover, a bottom plate and four side walls, and a cavity is formed inside the housing,
wherein a first recess is provided at one corner of four corners formed by the four side walls and the bottom plate, a mounting hole is provided in the first recess for installation of a rotatable clamp;
the clamp is configured to clamp a tube, and the clamp is provided with a first clamping hole, a second clamping hole, a third clamping hole and a fourth clamping hole; the first clamping hole is positioned opposite to the third clamping hole, and the second clamping hole is positioned opposite to the fourth clamping hole;
the first clamping hole and the third clamping hole are configured for an insertion of a first tube, and the second clamping hole and the fourth clamping hole are configured for an insertion of a second tube; an axis of the first clamping hole and the third clamping hole is perpendicular to an axis of the second clamping hole and the fourth clamping hole;
wherein the clamp includes a base and a plurality of clamping jaws, and the plurality of clamping jaws are arranged in two horizontal rows and arranged in two vertical columns on the base; two horizontal rows are arranged at intervals, and the first clamping hole and the third clamping hole are located between two horizontal rows; two vertical columns are arranged at intervals, and the second clamping hole and the fourth clamping hole are arranged between two vertical columns;
the base comprises a rotatable connecting post, which is installed in the mounting hole; the plurality of clamping jaws are connected with the connecting post, and the connecting post is configured to be rotatable in vertical directions to drive the plurality of clamping jaws to rotate in vertical directions, thereby the clamp is rotatable in vertical directions to make an opening of the first tube or an opening of the second tube face a direction suitable for use during the clamping of the first tube or the second tube, wherein a plurality of catch grooves are provided on a surface of the connecting post; the plurality of catch grooves are distributed along a circumferential direction, wherein the base further comprises a movable restricting member, and the restricting member includes an end, the restricting member is configured to be movable to make the end be inserted into the catch groove and be withdrawn from the catch groove; when the end of the restricting member is inserted into the catch groove, a rotation of the connecting post is restricted; after the end of the restricting member withdraws from the catch groove, a restriction on the connecting post is released, and the connecting post is configured to be rotatable against the restricting member to make the restricting member move and make the end of the restricting member withdraw from the catch groove, and the end of the restricting member is configured to be inserted into a next catch groove when the next catch groove is rotated to be opposite to the end of the restricting member.

2. The detection system using the suspension liquid biochip according to claim 1, wherein the number of the clamping jaws is four, and the four clamping jaws are arranged on the base at intervals according to a rectangular distribution; the four clamping jaws form two vertical columns and two horizontal rows; the two horizontal rows of clamping jaws are configured to clamp the first tube; the two vertical columns of clamping jaws are configured to clamp the second tube.

3. The detection system using the suspension liquid biochip according to claim 1, wherein the restricting member further includes an elastic reset device, the elastic reset device is configured to deform when the restricting member moves; the elastic reset device is configured to reset the restricting member.

4. The detection system using the suspension liquid biochip according to claim 3, wherein the elastic reset device is pre-deformed to generate an elastic force, the elastic force keeps the end of the restricting member in a state of being inserted into the catch groove; when the restricting member moves, a deformation of the elastic reset device is greater.

5. The detection system using the suspension liquid biochip according to claim 3, wherein the restricting member is provided with a recess, and the elastic reset device is a cylindrical spring; one end of the cylindrical spring abuts against the second recess, and the other end abuts against the bottom plate.

6. The detection system using the suspension liquid biochip according to claim 5, wherein a mounting plate is arranged in the second recess, the mounting plate is provided with a positioning post, and an end of the cylindrical spring is sleeved on the positioning post and abuts against the mounting plate.

7. The detection system using the suspension liquid biochip according to claim 6, wherein the positioning post is cross-shaped, and the positioning post is further provided with a convex column, the convex column is configured to be inserted into the cylindrical spring and thus connects the cylindrical spring with the positioning post.

8. The detection system using the suspension liquid biochip according to claim 1, wherein the housing is provided with a transparent plate through which the cavity can be observed.

9. The detection system using the suspension liquid biochip according to claim 7, wherein the housing is provided with an openable and closable door plate; the door plate is opposite to a cleaning liquid bottle provided in the cavity, and the cleaning liquid bottle can be taken out or put in after opening the door plate; the transparent plate is arranged on the door plate.

\* \* \* \* \*